G. A. ROGERS.
OPTICAL INSTRUMENT.
APPLICATION FILED JULY 12, 1911.
1,070,631.
Patented Aug. 19, 1913.
3 SHEETS—SHEET 1.
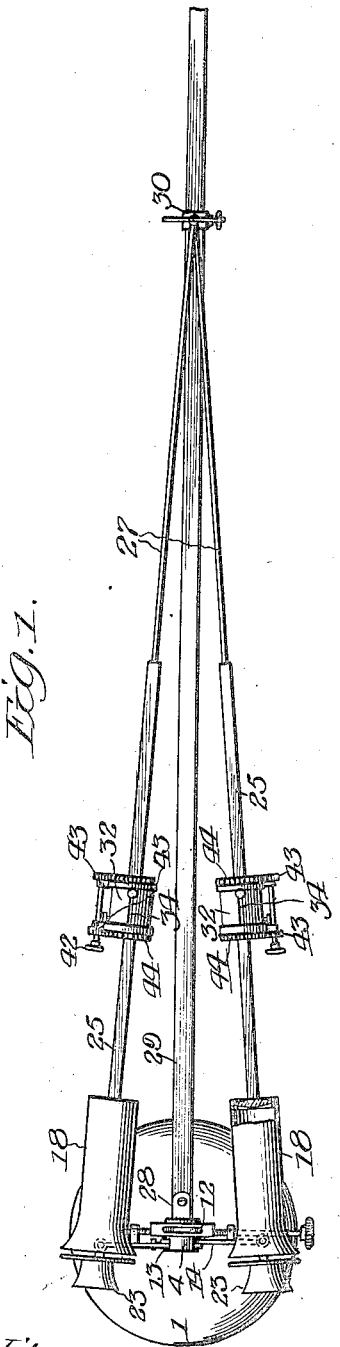
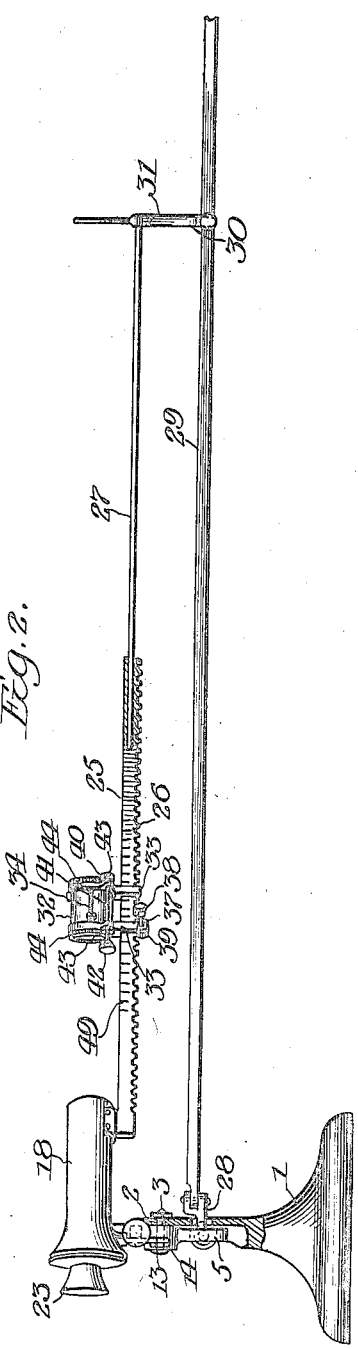
Witnesses
Inventor
George A. Rogers
By Benj. T. Roodhouse
Atty.

G. A. ROGERS.
OPTICAL INSTRUMENT.
APPLICATION FILED JULY 12, 1911.
1,070,631.
Patented Aug. 19, 1913.
3 SHEETS—SHEET 2.
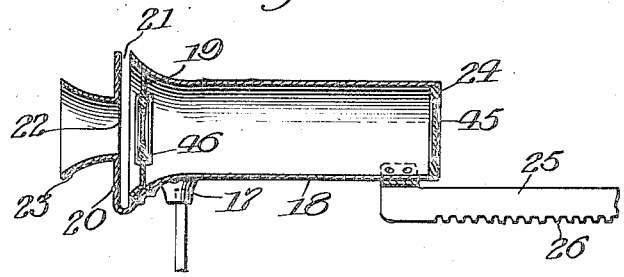
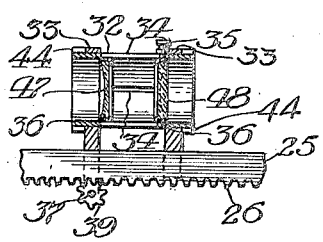
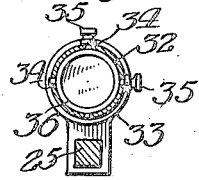
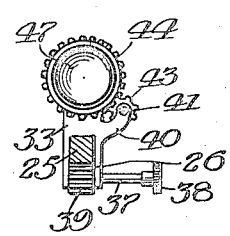
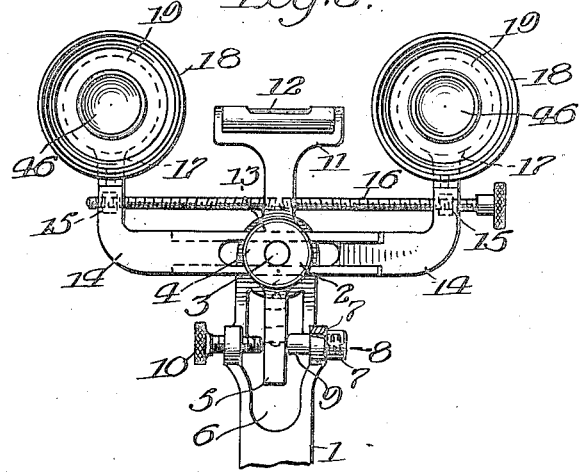
Witnesses
Inventor
George A. Rogers
by Benj. T. Roadhouse
Atty.

UNITED STATES PATENT OFFICE.

GEORGE A. ROGERS, OF CHICAGO, ILLINOIS.

OPTICAL INSTRUMENT.

1,070,631.

Specification of Letters Patent.

Patented Aug. 19, 1913.

Application filed July 12, 1911. Serial No. 638,050.

*To all whom it may concern:*

Be it known that I, GEORGE A. ROGERS, a citizen of the United States, and a resident of Chicago, in the county of Cook and State of Illinois, have invented a new and useful Optical Instrument, of which the following is a specification.

My invention relates to improvements in optical instruments which are used for testing and treating the eyes, and has special reference to the variety of instrument which depends upon the clearness with which the patient sees under different adjustments, and which may be styled subjective instruments. With such tests it is desirable to have the test object at a considerable distance, and in order to make the tests at a distance it is now the uniform practice to place test cards at a distance of six meters, or approximately twenty feet, or as far away as the conditions in the particular instance permit, and to place in a suitable frame before the eyes a series of spheres, cylinders and prisms, until the variety and amount of abnormality, if any, is ascertained from noting through which the patient reports seeing best.

The objects of my invention are, first, the provision of such an instrument in which distant objects may be employed as a target, and in which the size of the test object or angle of vision will not be changed for different adjustments; second, the provision of such an instrument in which the movement or adjustment of a member thereof will suffice to produce the requisite conditions and the use of the many test glasses will be obviated; third, the provision in such an instrument of facilities whereby different meridians of the same eye may be subjected to different simultaneous tests; fourth, the provision in such an instrument of facilities for examining the binocular accommodation which a patient may have; and, fifth, the provision of an instrument which may be employed for accelerating the muscular power or accommodation of the eye or eyes, and may also be used for the exercise or training of the muscles which have an effect on the vision.

Figure 8:
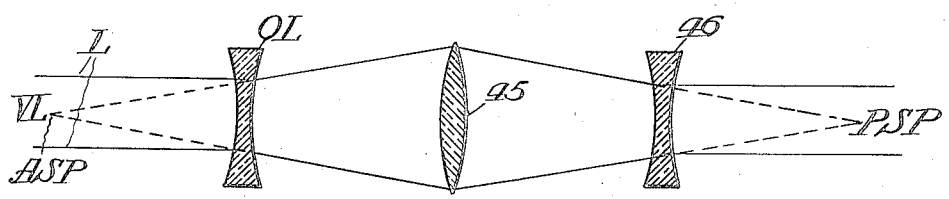
Figure 9:
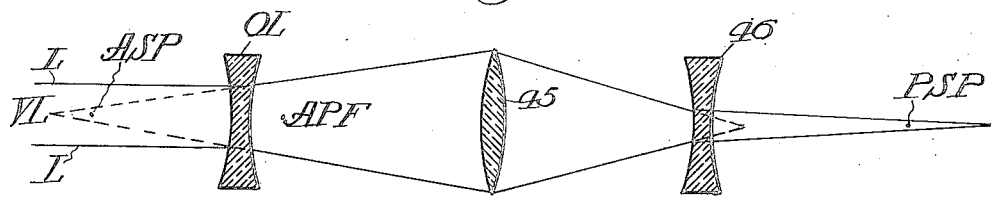
Figure 10:
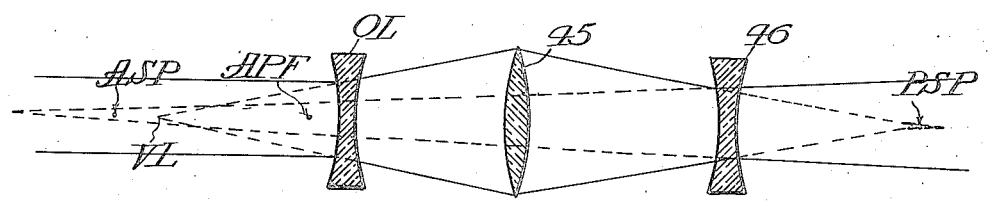

I attain the above objects by the device illustrated in the accompanying drawings, in which:

Figure 1 is a plan of my invention arranged for binocular examination; Fig. 2 is a side elevation of the structure shown in Fig. 1; Fig. 3 is a rear elevation of the instrument, the base of the stand being broken off; Fig. 4 is a longitudinal section through a lens tube; Fig. 5 is a longitudinal section through the forward or objective lens mounting; Fig. 6 is a transverse section through the forward lens mounting, showing the means for moving the lenses along the optical axis of the instrument; Fig. 7 is a transverse section through the forward lens mounting, showing means for rotating said mounting about the optical axis; and Figs. 8, 9 and 10 are diagrammatic views along the optical axis of the instrument showing adjustments for different conditions.

Similar reference numerals refer to similar parts throughout the several views.

The instrument is supported upon a stand in the following manner to permit of leveling the same. The top of the stand is formed into a round plate, 2, positioned vertically, against which is pivotally secured, by means of a bolt 3, the disk-shaped central portion 4 of a member, the lower end 5 of which projects downwardly into a vertical channel or slot 6, provided on the stand. A recess 7, opening upon the slot 6, is provided in the stand, and in this recess is a spring 8, upon which rests a plunger 9, the outer end of which impinges against the lower end 5 of the pivoted member. In the opposite wall of the slot, and opposite the plunger 9, is a set screw 10, by means of which the vertical position of the pivoted member may be adjusted. The upper end of the pivoted member terminates in a bracket 11, for holding a level 12. A transverse channel 13 is provided through the plate 2, and entering this from either side are the split arms 14, the split portions of which accommodate the bolt 3 and the outer ends of which turn upwardly. The upwardly turned portions of the arms 14 are bored and threaded at 15 to receive the right and left threaded screw 16. This structure is for adjusting the instrument to the width of the eyes of the patient.

Upon the upwardly turned tops of the arms 14 fit sockets 17, which are secured to lens tubes 18. The lens tube is clearly shown in Fig. 4. The rear portion thereof is flared and within the flared portion is secured a lens mounting 19. Back of the lens mounting the tube is closed by a plate 20, which is set sufficiently back from the tube to form with the tube a lens cell 21, in which a test lens may be placed if occasion requires. The plate 20 has a central opening 22, from the edges of which extends backwardly an eye cup 23. In the forward portion of the lens tube is secured another lens mounting 24.

Secured to the under portion of the lens tube near its forward end is an arm 25, the lower edge of which is provided with a rack 26. The arms 25 are longitudinally bored to telescopically receive the rods 27, shown in Figs. 1 and 2. A bracket 28 extends forwardly from the pivoted member 4 and to this bracket is pivoted an arm 29; a carriage 30 slides upon the arm 29, and to the carriage 30 are secured the ends of the rods 27. The arm 29 is graduated so that when the instrument is used for binocular effects any desired amount of convergence of the systems may be secured within practical limits. The carriage 30 has a standard 31 for supporting a test target, and when the instrument is employed in this manner both the accommodation for nearness of the object, and for convergence, is brought into play and the character thereof may be determined. It is, of course, possible to use the instrument for one eye at a time, and when it is desired to do so the carriage 30 is detached from the rods 27 and the arm 29 is swung out of the way.

The forward or objective portion of the lens system is mounted in a carriage which travels upon the arm 25, and comprises a barrel 32 which rotates upon its axis in straps 33, which extend about the arm 25 and hold the barrel to the arm. Two longitudinal slots 34, at 90° from each other, are provided in the barrel, and through these slots extend milled headed pins 35 to operate lens mountings 36. By this arrangement the separate lens mountings 36 may be moved independently longitudinally of the barrel 32. As shown in Figs. 2, 5 and 7, one of the straps 33 is prolonged below the arm 25 and in the prolonged portions is mounted an arbor 37, which is provided with a knurled head 38 and a gear 39 which meshes with the rack 26 upon the bottom of the arm 25. By means of this structure the entire barrel may be racked backward and forward upon the arm 25. As shown in Figs. 2 and 7, the straps 33 have brackets 40 extending from one side thereof, in which is mounted an arbor 41 which has a knurled head 42 and carries two gears 43, which mesh with gears 44 provided upon each end of the barrel 32, by means of which construction the entire barrel may be rotated upon its axis within the straps 33.

The above comprises the mechanical portions of my instrument which permit of the instrument being properly leveled through the instrumentality of the set screw 10; which will permit of the separate lens tubes being adjusted to the width of the patient's eyes; which will also permit of the use of a near target and the convergence of the lens tubes for reading and binocular tests and exercises; and which will permit of the rotation and either separate or combined longitudinal movement of the members of the objective portions of the lens system.

The optical portion proper, or the arrangement of the lens system, is as follows: In the lens mounting 24, located in the forward portion of the lens tube 18, is mounted a positive spherical lens 45, of a known focal power, say ten or sixteen diopters. This lens may be either plano convex or double convex. The position of the lens mounting 24 is such that it is just one focal length of the lens it supports from the lens mounting 19 in the rear of the lens tube. In the lens mounting 19 is provided a negative spherical lens 46, of exactly the same focal power and length as the lens 45. In the lens mountings 36, in the barrel 32, are mounted two equal negative cylinders, 47 and 48, the combined focal power and length of focus of which shall be equal to that of the separate lenses 45 and 46. The cylinders 47 and 48 are disposed with their axes at right angles to one another, so their combined action will be the same as that of a spherical lens.

The optical action of the above arrangement can best be appreciated by reference to the diagrammatic Figs. 8, 9 and 10, in which the forward or objective portion of the system is represented as a single negative spherical lens for the purpose of simplicity.

In Fig. 8 the rays L are shown parallel, or as emanating from an object at a considerable distance. The action of the objective lens "O. L." is such that a virtual image (designated V. L.) of the remote object is formed thereby at the distance of its focal length. In Fig. 8 the objective lens is positioned one focal length forward of the intermediate lens. The objective and intermediate lenses being of equal focal length, this virtual image will be located two focal lengths from the positive lens 45, which is the anterior symmetrical point (designated A. S. P.) of that lens, or the distance at which the lens will focus an image of an equal size the same distance upon its opposite side or at the posterior symmetrical point (designated P. S. P.). The rear or eye lens 46 being interposed between the lens 45 and the image formed thereby just one focal length forward of the said image will render the rays parallel or suitable for a normal or emmetropic eye. Hence a normal eye will see the distant object with this arrangement of lenses normally.

In Fig. 9 the objective lens is shown as racked forward of the anterior principal focal plane (designated A. P. F.) of the intermediate lens. This will carry the virtual image forward of the anterior symmetrical point of the intermediate lens. The result thereof would be that a real image would be formed thereby anterior to its posterior symmetrical point, or at such a position that the eye lens 46 would no longer render the rays parallel. They would therefore enter the eye, converging or suitable for a hypermetropic eye.

In Fig. 10 the objective lens is shown as racked back of the anterior principal focus of the intermediate lens, which brings the virtual image nearer than the anterior symmetrical point of the intermediate lens, which results in the formation of the image by the intermediate lens posterior to its posterior symmetrical point. Hence the action of the eye lens renders these rays divergent, which adapts them to a myopic eye.

The amount or extent of convergence or divergence that is secured depends upon the position of the objective lens anterior or posterior to the anterior principal focus of the intermediate lens, and the change is equal for equal distances of movement. I have therefore provided a scale 49 upon the arm 25, which is numbered to show the change in diopters for different positions of the objective lens. By forming the objective lens of equal cylinders, the same principle is applied to different meridians of an eye, where the eye under examination is astigmatic, and by rotating the objective element the meridians of greatest and least refraction may be determined and measured separately.

Having described my invention, what I claim as new and desire to secure by Letters Patent is:

1. In an optical instrument, a lens system comprising two negative elements and an intermediate positive element, said elements being of equal focal length, one negative and the positive element being located a focal length apart and the remaining negative element being movable along the optical axis of the system.

2. In an optical instrument, a lens system comprising a negative and a positive spherical member of equal focal length positioned at a focal length distance from each other, and two equal negative cylindrical members having their axes at right angles, said cylindrical members being movable relative to each other and relative to the spherical members longitudinally of the optical axis of the system.

3. In an optical instrument, a lens system comprising a negative and a positive spherical member of equal focal length positioned at a focal length distance from each other, and two equal negative cylindrical members having their axes at right angles, said cylindrical members having a combined focal length equal to one of said spherical members, and said cylindrical members being movable relative to each other and relative to the spherical members longitudinally of the optical axis of the system.

4. In an optical instrument, a lens system comprising a negative and a positive spherical member of equal focal length positioned at a focal length distance from each other, and two equal negative cylindrical members having their axes at right angles, said cylindrical members being movable relative to each other and relative to the spherical members longitudinally of the optical axis of the system and rotatable about said optical axis.

5. An optical instrument having separate mountings for two lens systems, each comprising two negative lens elements and an intermediate positive lens element of equal focal lengths, one negative and the positive lens element being mounted a focal length in distance from each other, means for moving the other negative lens element along the optical axis, said mountings being pivoted at their anterior ends, rods telescopically carried by said mountings, an independent arm, a carriage mounted on said arm, said rods being pivoted to said carriage whereby the movement of said carriage secures a known angular convergence of said systems.

6. An optical instrument having separate mountings for two lens systems, each comprising two negative lens elements and an intermediate positive lens element of equal focal lengths, one negative and the positive lens element being mounted a focal length in distance from each other, means for moving the other negative lens element along the optical axis, said mountings being pivoted at their anterior ends, rods telescopically carried by said mountings, an independent arm, a carriage mounted on said arm, means for supporting a target upon said carriage, said rods being pivoted to said carriage whereby the movement of said carriage secures a known angular convergence of said systems.

7. In an optical instrument, a lens system comprising an intermediate positive lens element, an ocular lens element located in the plane of the posterior principal focus of said positive element, and a negative objective lens element of the same focal length as the positive element movable along the optical axis of the system.

GEORGE A. ROGERS.

Witnesses:
HALLIE B. LEHMAN,
BENJ. T. ROADHOUSE.